United States Patent [19]

Yamada et al.

[11] Patent Number: 4,873,884
[45] Date of Patent: Oct. 17, 1989

[54] APPARATUS FOR SUPPORTING SHIFT LEVER FOR TRANSMISSION

[75] Inventors: Ichiji Yamada, Toyota; Yutake Inuzuka, Nishio; Isao Ichihara; Michiyuki Murakami, both of Toyoake; George Suzuki, Chiryu; Ryou Yanahashi, Aichi; Takeshi Kondo, Nagoya, all of Japan

[73] Assignees: Toyota Jidosha Kabushi Kaisha; Tsuda Industries, Co., Ltd., both of Aichi, Japan

[21] Appl. No.: 233,034

[22] Filed: Aug. 17, 1988

[30] Foreign Application Priority Data

Sep. 8, 1987 [JP] Japan .................. 62-137099[U]
Sep. 8, 1987 [JP] Japan .................. 62-137100[U]
Sep. 21, 1987 [JP] Japan .................. 62-144149[U]
Jun. 13, 1988 [JP] Japan .................. 63-145062

[51] Int. Cl.⁴ .......................... G05G 8/16; F16C 11/06; F16D 1/12
[52] U.S. Cl. .................. 74/473 P; 74/473 R; 74/523; 74/543; 74/606 R; 403/114; 403/131
[58] Field of Search ............ 74/523, 528, 606 A, 74/606 R, 473 P, 536, 519, 520, 527, 532, 566, 534, 473 R, 543; 403/114, 115, 128, 131, 125, 58, 143

[56] References Cited

U.S. PATENT DOCUMENTS

| 2,741,138 | 4/1956 | Russell ............................ 74/528 |
| 3,800,909 | 4/1974 | Duncanson et al. .............. 74/523 X |
| 4,457,188 | 7/1984 | Hauser ............................ 74/473 P |
| 4,569,245 | 2/1986 | Feldt et al. ..................... 74/473 P |
| 4,581,951 | 4/1986 | Watson .......................... 74/473 R |
| 4,603,598 | 8/1986 | Tsuji et al. ..................... 74/523 |
| 4,662,772 | 5/1987 | Schultz ........................... 403/114 |
| 4,679,957 | 7/1987 | Bauer ............................. 403/131 X |
| 4,693,135 | 9/1987 | La Rocca et al. ................ 74/473 P |
| 4,726,249 | 2/1988 | Inuzuka et al. .................. 74/473 P |
| 4,766,206 | 7/1988 | Kao ............................... 74/606 R X |

FOREIGN PATENT DOCUMENTS

| 2159715 | 6/1973 | Fed. Rep. of Germany .... 74/473 P |
| 2432555 | 1/1975 | Fed. Rep. of Germany .... 74/473 P |
| 2460769 | 7/1976 | Fed. Rep. of Germany .... 74/473 P |
| 859997 | 1/1941 | France ........................... 74/473 R |
| 0085117 | 5/1982 | Japan ............................. 74/473 P |
| 0161621 | 9/1983 | Japan ............................. 74/473 R |

Primary Examiner—Vinh Luong
Attorney, Agent, or Firm—Oliff & Berridge

[57] ABSTRACT

A shift lever supporting apparatus for a transmission, has an integral structure comprising a cylindrical shift lever mounting portion for receiving a ball portion of a shift lever, a pyramidal retainer portion contiguously provided below the shift lever mounting portion, a plate portion contiguously provided below the retainer portion, and a bearing portion for mounting a select bellcrank, the bearing portion being contiguously provided on the retainer portion and in close proximity to the shift lever mounting portion. The shift lever mounting portion is provided with a seat surface for supporting the ball portion of the shift lever, and a U-shaped notch which allows insertion of a select lever extending from the ball portion. The ball portion of the shift lever is inserted into the shift lever mounting portion from the upper side and this ball portion is pressed against and thereby retained on the seat surface by the use of a cap.

8 Claims, 7 Drawing Sheets

FIG. 16
PRIOR ART ced on the seat surface.

APPARATUS FOR SUPPORTING SHIFT LEVER FOR TRANSMISSION

BACKGROUND OF THE INVENTION

1. Field of the Invention

The present invention relates to an apparatus for supporting a shift lever used to control a floor remote control type transmission.

2. Description of the Prior Art

Figure 14:
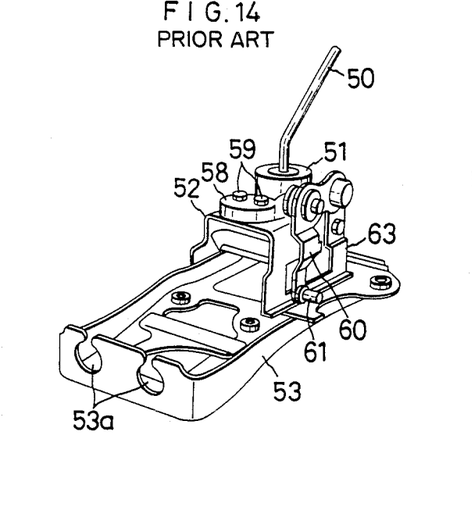
FIG. 14 is a perspective view of a conventional shift lever supporting apparatus.
Figure 15:
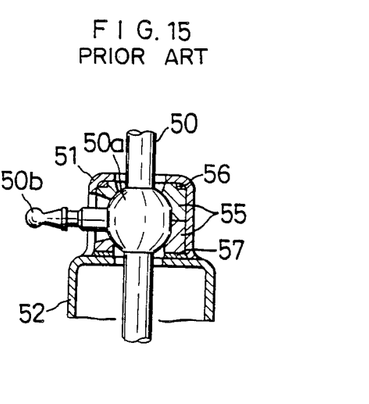
FIG. 15 is a vertical sectional view showing the structure for supporting the ball portion of the shift lever.
Figure 16:
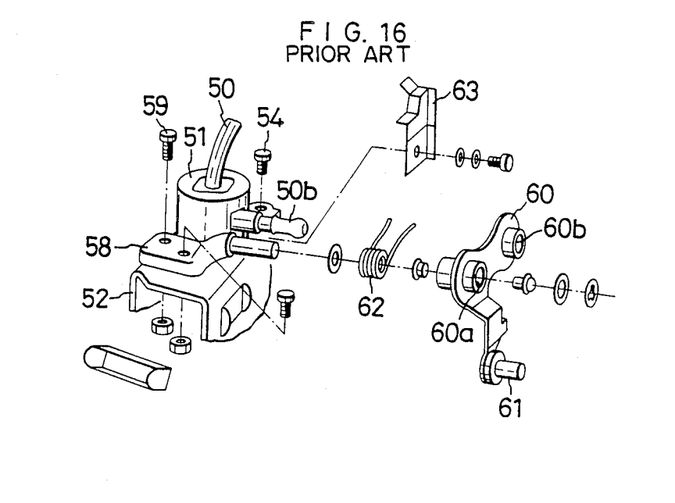
FIG. 16 is an exploded perspective view of the conventional shift lever supporting apparatus.

A typical conventional shift lever supporting apparatus of the type described above has heretofore been arranged as shown in FIGS. 14 to 16. Referring to these figures, the reference numeral 50 denotes a shift lever, 51 a cup-shaped holder member for supporting a ball portion 50a of the shift lever 50, 52 a retainer, and 53 a plate serving as a mounting member which is secured to the body of a vehicle. These members are formed as separate members from metallic materials. The holder member 51 is rigidly secured to the retainer 52 by means of a bolt 54, and the retainer 52 and the plate 53 are welded together in one unit. Inside the holder member 52 are accommodated a pair of upper and lower seats 55 for rotatably supporting the ball portion 50a of the shift lever 50, together with a cushion 56 and a shim 57 (see FIG. 15).

A bearing 58 for retaining a select bell-crank 60 is rigidly secured to the upper surface of the retainer 51 by means of bolts 59. The select bell-crank 60 is formed in the shape of an L from a metallic material. The select bell-crank 60 has an insertion bore 60a provided in its proximal portion so that the bell-crank 60 is carried on the bearing 58 through the insertion bore 60a. In one end portion of the select bell-crank 60 is provided an insertion bore 60b through which the bell-crank 60 is linked with a select lever 50b extending sideward from the ball portion 50a of the shift lever 50. In the other end portion of the select bell-crank 60 is provided a mounting bore (not shown) for a select cable securing pin 61. The select bell-crank 60, together with a spring 62, is fitted on the bearing 58 and, at this time, the select lever 50b is inserted into the insertion bore 60b. Thus, the select bell-crank 60 is linked with the shift lever 50 such that the former is movable in response to the movement of the latter. It should be noted that the spring 62 is engaged at one end thereof with a stopper 63 which is fastened to the retainer 52 by means of a bolt, thus constantly biasing the shift lever 50 so as to be positioned in a neutral position.

In the above-described supporting structure, a shift cable (not shown) and a select cable (not shown) which are introduced through respective cable insertion bores 53a provided in the plate 53 are respectively connected to the lower end portion of the shift lever 50 which extends downward from the ball portion 50a and to the securing pin 61 mounted on the select bell-crank 60. Thus, as the shift lever 50 is moved, the select bell-crank 60 moves in response to the movement of the shift lever 50, thereby enabling the transmission to be controlled through each of the cables.

However, the above-described conventional transmission shift lever supporting apparatus has the following disadvantages. In assembly, the prior art apparatus needs a large number of steps, for example, the step of welding the retainer 52 and the plate 53 together in one unit, the step of surrounding the ball portion 50a of the shift lever 50 with the upper and lower seats 55 and securing the resulting assembly with the holder member 51, fastening the bearing 58 for the select bell-crank 60 to the retainer 52 by means of bolts, and the step of fastening the stopper 63 for the spring 62 to the retainer 52 by means of a bolt. Therefore, the prior art suffers from low productivity and difficulty in ensuring the required assembling accuracy. In particular, to mount the shift lever 50, it is necessary to first assemble together the ball portion 50a of the shift lever 50, the seats 55, the cushion 56 and the shim 57 inside the holder member 51 in such a manner that the ball portion 50a is surrounded with the other members, and then secure this assembly to the retainer 52 by means of the bolt 54. Thus, the assembling operation is considerably troublesome.

It should be noted that Japanese Utility Model Public Disclosure No. 60-05829 (1985) discloses a wire type speed change control apparatus for a transmission having a different type of shift lever. In this case also, a member which corresponds to the retainer and a shift lever plate are formed as separate members and these are connected together in one unit by welding or other similar means.

Japanese Utility Model Public Disclosure Nos. 61-203834 (1986) and 61-203835 (1986) also disclose supporting structures of the type in which a ball portion of a shift lever is supported by a cup-shaped holder member.

SUMMARY OF THE INVENTION

It is a primary object of the present invention to provide a transmission shift lever supporting apparatus which has a reduced number of parts and is easy to assemble and which enables the required assembling accuracy to be readily ensured.

To this end, the present invention provides a shift lever supporting apparatus for a floor remote control type transmission, comprising: a cylindrical shift lever mounting portion for receiving a ball portion of a shift lever; a pyramidal retainer portion contiguously provided below the shift lever mounting portion; a plate portion contiguously provided below the retainer portion; a bearing portion for mounting a select bell-crank, the bearing portion being contiguously provided on the retainer portion and in close proximity to the shift lever mounting portion, these four portions, that is, the mounting portion, the retainer portion, the plate portion and the bearing portion, being formed integral with each other; a seat surface for supporting the ball portion of the shift lever, the seat surface being provided inside the shift lever mounting portion; a U-shaped notch provided in the side wall of the shift lever mounting portion, the notch allowing insertion of a select lever extending from the ball portion; and a cap detachably fitted on the shift lever mounting portion to press and retain ball portion of the shift lever on the seat surface.

In the present invention, the above-described cap may be provided in one end thereof with a shaft insertion bore so that the cap can be attached to the bearing portion by making use of a bell-crank shaft for supporting the select bell-crank. Retaining means for securing the cap is preferably provided in advance on the shift lever mounting portion and/or the retainer portion at the side thereof which is remote from the bearing portion.

The cap may be defined by a plate clip which is fitted into a slit provided in the wall of the shift lever mounting portion so that the ball portion of the shift lever is pressed against the seat surface by making use of the resilient force from the plate clip.

By virtue of the above-described arrangement of the transmission shift lever supporting apparatus, the following advantages are provided.

Since the shift lever mounting portion, the retainer portion, the plate portion and the bearing portion are formed integral with each other, the number of parts to be assembled is reduced by a large margin and the time required to assemble the apparatus is considerably shortened. Thus, productivity is improved and the degree of assembling accuracy is increased. In particular, since the shift lever mounting portion having a seat surface is provided on the upper side of the retainer, it is possible to insert the shift lever, the seat for supporting the ball portion of the shift lever, etc. directly into the shift lever mounting portion. Accordingly, it is possible to eliminate the need for time and labor heretofore required to conduct preliminary assembling and therefore the number of assembling steps is reduced by a large margin.

Since the retainer portion is formed in the shape of a pyramid having the shift lever mounting portion disposed at its apex, the rigidity of the retainer portion increases, so that it becomes possible to use a resin material. Thus, it is possible to reduce the overall weight by a large margin and lower the production cost. Employment of a resin material enables reduction of vibration and noise generated in the plate portion and the rotary portion due to the movement of the shift cable.

BRIEF DESCRIPTION OF THE DRAWINGS

FIGS. 1 to 5 show in combination one embodiment of the shift lever supporting apparatus according to the present invention, in which:

FIGS. 11 to 13 show in combination a modification of the select bell-crank, in which:

FIGS. 14 to 16 show in combination a prior art, in which:

DETAILED DESCRIPTION OF THE INVENTION

One embodiment of the present invention will be described hereinunder with reference to the accompanying drawings. It should be noted that, in the figures that show the embodiment, the same portions as those shown in FIGS. 14 to 16 are denoted by the same reference numerals and repeated description thereof is omitted.

Figure 3:
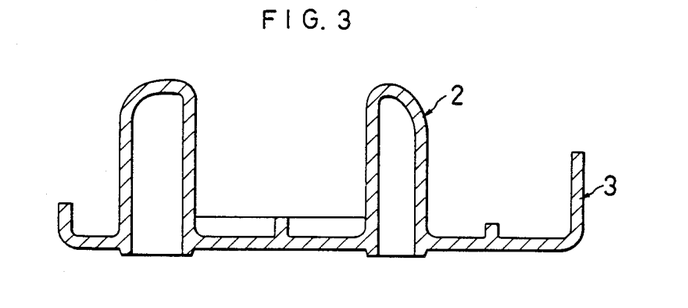
FIG. 3 is a sectional view taken along the line III—III of FIG. 2.
Figure 4:
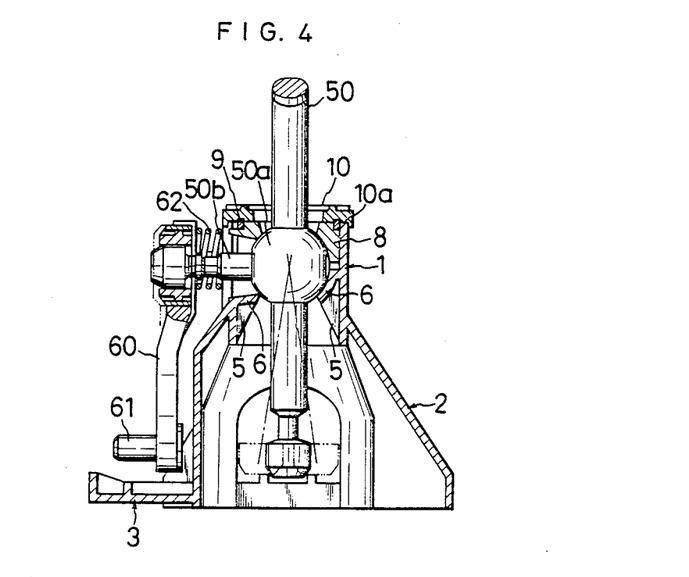
FIG. 4 is a vertical sectional view of the shift lever supporting apparatus.

In FIGS. 1 to 15, the reference numeral 1 denotes a cylindrical shift lever mounting portion for receiving the ball portion 50a of the shift lever 50, and 2 a pyramidal retainer portion contiguously provided below the shift lever mounting portion 1. The numeral 3 denotes a plate portion contiguously provided below the retainer portion 2, the plate portion 3 serving as a mounting portion through which the shift lever supporting apparatus is secured to the body of a vehicle. The numeral 4 denotes a bearing portion contiguously provided above the retainer portion 2, the bearing portion 4 facing the shift lever mounting portion 1 and serving as a portion for mounting the select bell-crank 60. These portions are formed integral with each other from a resin material by molding process. A part of the slant surface of the retainer portion 2 has a hat-shaped cross-sectional configuration (see FIG. 3) and reinforcing ribs 5 are provided inside the retainer portion 2 at the boundary between the shift lever mounting portion 1 and the retainer portion 2 (see FIG. 4) with a view to enhancing the overall rigidity of the supporting structure and reducing the overall weight thereof.

Figure 5:
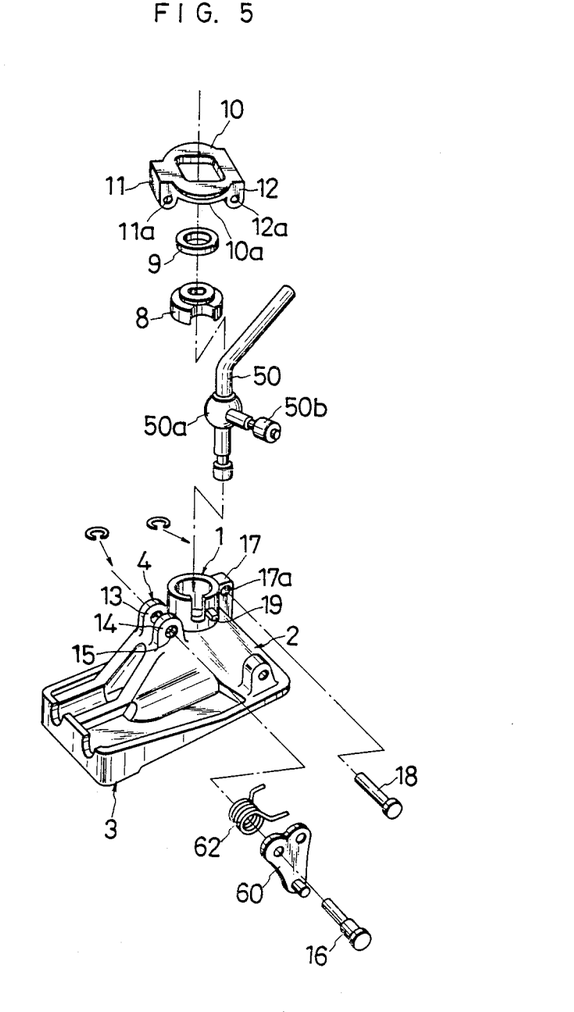
FIG. 5 is an exploded perspective view of the shift lever supporting apparatus.

A seat portion 6 for supporting the ball portion 50a of the shift lever 50 is integrally provided inside the shift lever mounting portion 1. A U-shaped notch 7 the upper side of which is open is provided in the wall of the shift lever mounting portion 1. The select lever 50b which extends sideward from the ball portion 50a is positioned within the notch 7, thereby allowing the shift lever 50 to be inserted into the shift lever mounting portion 1 from the upper side, and thus enabling the ball portion 50a to rest on the seat portion 6 (see FIG. 5).

In the mounting portion 1, the ball portion 50a of the shift lever 50 is pressed at its upper half by a seat 8. The seat 8 is pressed at its upper end by a cap 10 through a cushion 9, the cap 10 being provided on the shift lever mounting portion 1 so as to cover the opening thereof. Thus, the shift lever 50 is reliably retained by the shift lever mounting portion 1.

Boss portions 11 and 12 are formed at both ends, respectively, of the cap 10. Bores 11a and 12a are provided in the boss portions 11 and 12, respectively. The bearing portion 4 has a pair of projections 13 and 14 which face each other across an appropriate gap. The gap between the projections 13 and 14 is set at such a dimension that the boss portion 11 of the cap 10 can be fitted into the gap. The projections 13 and 14 are provided with a mutual bore 15. With the boss portion 11 fitted in the gap between the projections 13 and 14, a bell-crank shaft 16 is inserted into both the bore 11a and the bore 15, and the cap 10 is thereby attached to the bearing portion 4 (see FIG. 5). The bell-crank shaft 16 is jointly used to carry the select bell-crank 60 and to mount the spring 62. By means of the bell-crank shaft 16, the cap 10 is retained at the gap between the projections 13 and 14 and, at the same time, the select bell-crank 60 and the spring 62 are pivotally attached to one side of the projection 14 in one unit (see FIG. 4).

A cap securing piece 17 is provided on the upper part of the retainer portion 2 on the side thereof which is remote from the bearing portion 4 such that the cap securing piece 17 faces the bearing portion 4 across the shift lever mounting portion 1. The other boss portion 12 of the cap 10 is connected to the cap securing piece 17 by means of a pin 18 which is inserted through both the bore 12a and a bore 17a provided in the cap securing piece 17.

It should be noted that the cap 10 has a collor portion 10a around its periphery, the collar portion 10a being fitted on the shift lever mounting portion 1. The mounting portion 1 has a stopper 19 provided on the outer peripheral surface thereof and in close proximity to the notch 7, the stopper 19 retaining one end of the spring 62 which biases the shift lever 50 so as to return to its neutral position. In addition, cable insertion bores 20 are provided in one end of the plate portion 3.

Figure 1:
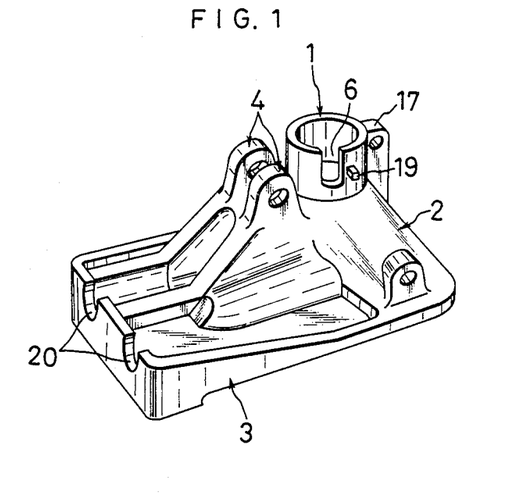
FIG. 1 is a perspective view of an integral structure having a retainer portion, a shift lever mounting portion, a plate portion and a bearing portion.
Figure 2:
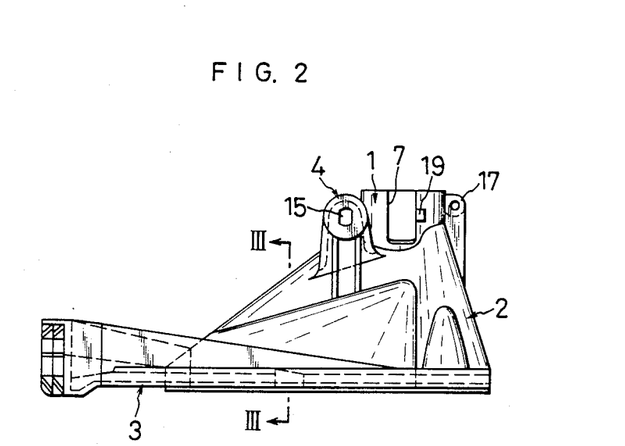
FIG. 2 is a side view of the structure shown in FIG. 1.

When the shift lever 50 is to be set in the shift lever mounting portion 1, the shift lever 50 is first inserted into the mounting portion 1 and the ball portion 50a is rested on the seat portion 6 and, subsequently the seat 8 and the cushion 9 are inserted into the mounting portion 1, as shown in FIG. 1. Next, one boss portion 11 of the cap 10 is fitted into the gap between the projections 13 and 14 of the bearing portion 4 and, in this state, the bell-crank shaft 16 having both the select bell-crank 60 and the spring 62 fitted thereon is passed through both the bore 15 in the bearing portion 4 and the bore 11a in the boss portion 11, thereby connecting one end of the cap 10 to the bearing portion 4. Subsequently, the other boss portion 12 of the cap 10 is engaged with the cp securing piece 17 and, in this state, the pin 18 is passed through bore the bore 17a and the bore 12a, thereby connecting the other end of the cap 10 to the cap securing piece 17, and thus completing a series of assembling steps.

Figure 6:
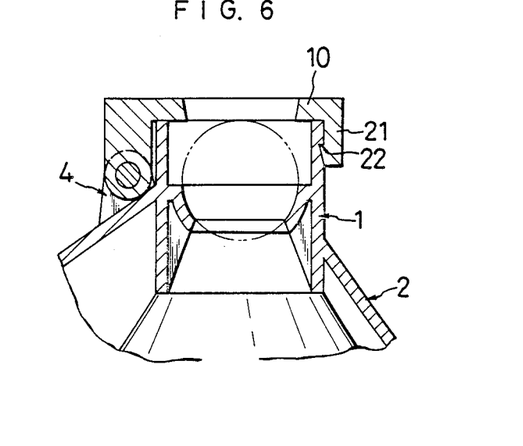
FIGS. 6 and 7 are sectional side views respectively showing modifications of the cap mounting structure.
Figure 7:
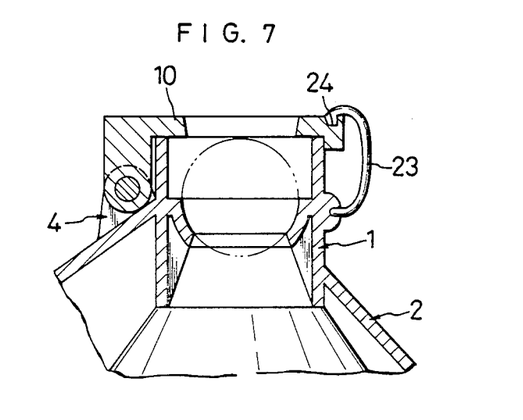

It should be noted that, although in the foregoing embodiment the means for retaining one end of the cap 10 comprises the cap securing piece 17 and the pin 18, this securing structure is not necessarily limitative. For example, the arrangement may be such that an engagement member 21 is provided at one end of the cap 10 and this engagement member 21 is engaged with a step 22 provided on the periphery of the mounting portion 1, as shown in FIG. 6. Alternatively, the arrangement may be such that a hook 23 is provided on the mounting portion 1 and this hook 23 is engaged with a recess 24 provided in the cap 10, as shown in FIG. 7.

Figure 8:
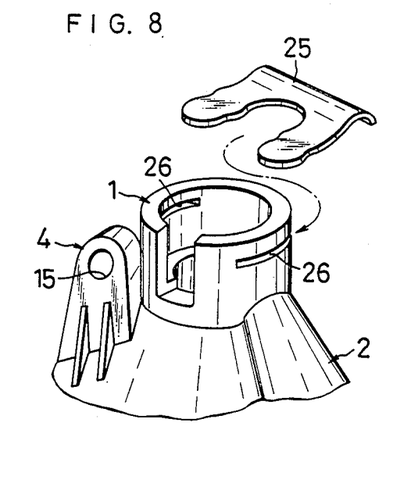
FIG. 8 is a perspective view of a modification of the cap.
Figure 9:
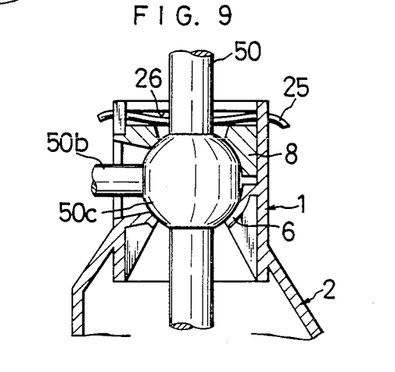
FIG. 9 is a vertical sectional view of the cap shown in FIG. 8 which is in its mounted state.

The cap 10 in the foregoing embodiment may be replaced with a plate clip 25 shown in FIGS. 8 and 9. In this case, a pair of circumferentially extending slits 26 are provided in the wall of the shift lever mounting portion 1 such that the slits 26 face each other, and the plate clip 25 is fitted into the slits 26. If the plate clip 25 is formed so as to have a curved surface in advance, when the clip 25 is in the above-described fitted state, resilient force is applied to the seat 8, so that the ball portion 50a of the shift lever 50 is reliably pressed against and thereby retained on the seat portion 6 even if the cushion 9 in the described embodiment is omitted.

Figure 10:
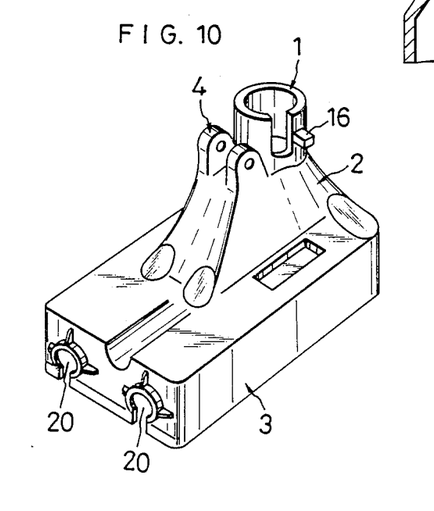
FIG. 10 is a perspective view of a modification in which cable insertion bores are provided at the reverse side of the plate portion.

The plate portion in the foregoing embodiment may be replaced with a box-shaped plate portion 3' the lower side of which is open and which has cable insertion bores 20 provided at the reverse side thereof, as shown in FIG. 10.

Figure 11:
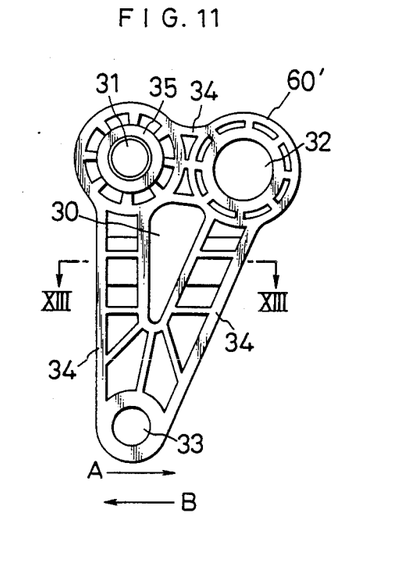
FIG. 11 is a front view of the select bell-crank.
Figure 12:
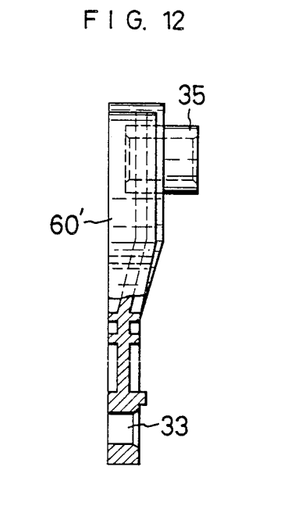
FIG. 12 is a partly-sectioned side view of the select bell-crank.
Figure 13:
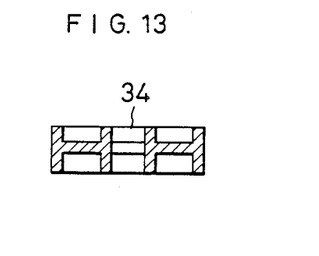
FIG. 13 is a sectional view taken along the line XIII—XIII of FIG. 11.

The select bell-crank may be formed into a triangular select bell-crank 60' having a window 30 from a resin material by molding process, as shown in FIGS. 11 to 13. In this case, an insertion bore 31 for the bell-crank shaft 16, an insertion bore 32 for the select lever 50b and a mounting bore 33 for the select cable securing pin 61 are provided in the vertices, respectively, of the triangular select bell-crank 60', and each pair of adjacent vertices are connected together through an arm 34. In addition, a bearing boss 35 is formed integral with the edge of the insertion bore 31 for the bell-crak shaft 16.

Thus, select cable pulling force acts on the two arms in the form of either compressive force or tensile force, and the applied force is halved by the two arms, so that it is possible to form the select bell-crank 60' using a resin material by integral molding process and hence reduce the overall weight by a large margin. Since it is possible to to form the shift lever supporting apparatus by molding process using a resin material or the like, productivity is improved. In addition, the number of required parts is reduced and the assembling time is therefore shortened; therefore, productivity is further improved. At the bearing portion, it is possible to combine together a metallic shaft and a resin bearing, so that friction occurring between the shaft and the bearing is reduced and no noise is generated. Thus, the present invention provides great practical advantages.

What is claimed is:

1. A shift lever supporting apparatus kfor a transmission, comprising:
   a cylindrical shift lever mounting portion for receiving a ball portion of a shift lever;
   a pyramidal retainer portion contiguously provided below said shift lever mounting portion;
   a plate portion contiguously provided below said retainer portion;
   a bearing portion for mounting a select bell-crank, said bearing portion being contiguously provided on said retainer portion and in close proximity to said shift lever mounting portion, said four portions, that is, said mounting portion, said retainer portion, said plate portion and said bearing portion, being formed integral with each other;
   a seat surface for supporting the ball portion of said shift lever, said seat surface being provided inside said shift lever mounting portion;
   a U-shaped notch provided in the side wall of said shift lever mounting portion, said notch allowing insertion of a select lever extending from said ball portion; and
   a cap detachably fitted on said shift lever mounting portion for pressing and retaining said ball portion on said seat surface.

2. A shift lever supporting apparatus according to claim 1, wherein said shift lever mounting portion, said retainer portion, said plate portion and said bearing portion are formed integralwith each other from a resin material by molding process.

3. A shift lever supporting apparatus according to claim 1, wherein said retainer portion has a hat-shaped cross-sectional configuration.

4. A shift lever supporting apparatus according to claim 1, wherein said one end of said cap is attached to said bearing portion by a bell-crank shaft for pivotally supporting said select-bell crank.

5. A shift lever supporting apparatus according to claim 1 wherein said bearing portion has a pair of projections facing each other across a predetermined gap.

6. A shift lever supporting apparatus according to any of claims 1, wherein one end of said cap is fitted in a gap between a pair of projections, a bell-crank shaft extending through said projections and the one end of said cap.

7. A shift lever supporting apparatus according to claim 1, wherein at least one of said shift lever mounting portion and said retainer portion is provided with retaining means for detachably retaining said cap.

8. A shift lever supporting apparatus according to claim 1, wherein said cap is defined by a plate clip, the wall of said shift lever mounting portion being provided with a slit for receiving said plate clip.

* * * * *